Aug. 31, 1943.　　R. R. CHAPPELL ET AL　　2,328,054
RECORDER
Original Filed April 29, 1936
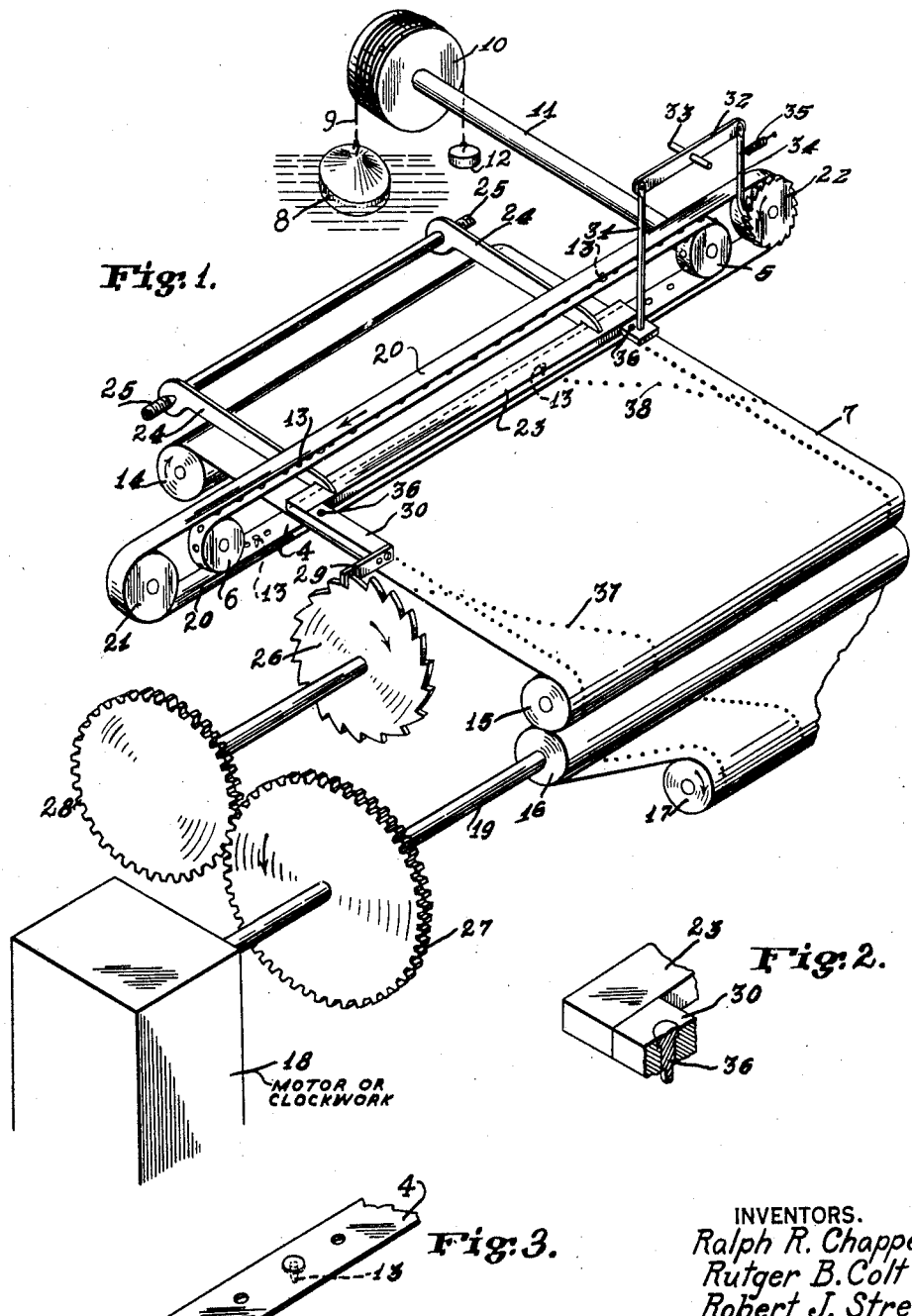
INVENTORS.
Ralph R. Chappell
Rutger B. Colt
Robert J. Streb
BY
Cerstvik & Kalman
ATTORNEYS.

Patented Aug. 31, 1943

2,328,054

UNITED STATES PATENT OFFICE 2,328,054

RECORDER

Ralph R. Chappell, Richmond, Va., and Rutger B. Colt and Robert J. Streb, Baltimore, Md., assignors to Bendix Aviation Corporation, Bendix, N. J., a corporation of Delaware Original application April 29, 1936, Serial No. 77,060. Divided and this application December 14, 1940, Serial No. 370,208

3 Claims. (Cl. 234—68)

The present invention relates to recording apparatus, and more particularly to novel recording means for recording instantaneous values of a variable such, for example, as a variable force, position, fluid pressure, temperature, water stage, etc., and is a division of co-pending application Serial No. 77,060, filed April 29, 1936, now Patent No. 2,232,589, dated February 18, 1941.

One of the objects of the invention is to provide novel recording apparatus for producing a permanent record on a record receiving surface, whereby a curve of any range of values plotted on any desired scale may be produced on a comparatively narrow record receiving surface without the necessity for reversing the recording means each time the curve has traversed the record receiving surface, and, accordingly, without changing the direction of the slope of the curve to indicate like changes in the plotted values.

Another object is to provide novel recording apparatus which is simple both in construction and operation, which may be readily and inexpensively manufactured, and which is rugged, yet accurate and reliable.

A still further object is to provide a novel recording means for recording values of a variable, wherein a measurable movement or time interval is representative of the value of the variable by recording both the beginning and end of said movement or interval.

Still another object of the invention is to provide a novel recorder having means for producing a record, trace or curve of any range of values on a comparatively narrow record receiving chart or surface by tapping a series of dots by means of a tapper bar cooperating with a plurality of markers carried by an endless belt, without any necessity for reversing the motion of the markers each time they have traversed the chart and, therefore, without changing the direction of the slope of the trace or curve to indicate like changes in the recorded values, and by tapping a series of dots along an edge of the chart by means of a separate marker or markers carried at one or both ends of the tapper bar to provide a margin reference line at one or both edges of the chart, so that the distance from any point on the curve to one of the margin reference lines represents the then value of the function being measured and recorded.

The above and other objects and novel features of the invention will appear more fully hereinafter from the following detailed description, when taken in connection with the accompanying drawing wherein one embodiment of the invention is illustrated by way of example. It is to be expressly understood, however, that the drawing is for the purpose of illustration only, and is not designed as a definition of the limits of the invention, reference being had for this purpose to the appended claims.

In the drawing, wherein like reference characters refer to like parts in the three views, Figure 1 is a diagrammatic isometric view of one form of the novel recording apparatus embodying the invention;

Figure 2 is an enlarged detail view, partly in section and with parts broken away, of a part of the marking mechanism of the apparatus of Figure 1; and Figure 3 is an enlarged detail view of a portion of the marking mechanism of Figure 1.

Referring now to the drawing and more particularly to Figure 1, the recorder comprises, as shown, an endless belt 4 mounted on pulleys 5 and 6, which is moved over a record receiving surface or chart 7 by means of a float 8 connected by a cord or cable 9 to a drum 10 which is, in turn, connected to pulley 5 by means of a rotatably mounted shaft 11.

To take up the slack in the cord or cable 9 and to counterbalance the float 8 so that the latter may rise and fall easily with change in level (water stage) of the liquid in which it floats, a counterweight 12, or other suitable means, is provided, whereby upon rise and fall of the float 8 the drum 10 is rotated in one direction or the other, depending upon whether the liquid level is rising or falling. A plurality of marking elements 13, carried by belt 4 and spaced apart thereon a distance not greater than the width of the record receiving surface or chart 7, are thus moved, one at a time, across said chart whenever float 8 rises or falls in response to a change in the liquid level determined by float 8.

The record receiving surface or chart 7 is in the form of a paper tape originating on a supply roller 14 and passes under belt 4, over an idler roller 15, over a driving roller 16, and onto a take-up roller 17. Chart 7 is moved in a direction at right angles to the direction of the effective movement of belt 4 by any suitable driving means 18, such as an escapement mechanism or constant speed motor, which is connected to driving roller 16 by means of a shaft 19.

Marking elements 13 may be constructed as in the illustrated embodiment, constituting novel means employing the principles of a typewriter for marking the record or curve, thereby avoiding the use of fluid ink.

Accordingly there is provided, as shown, an endless inked ribbon 20 which is mounted on a pair of spaced rollers 21 and 22, the lower reach of said inked ribbon passing between belt 4 and record receiving chart 7.

In order to produce a periodic record of the position of float 8, a tapper bar 23 is supported by arms 24 and pivots 25 over the lower reach of belt 4, and means operated in coordination with the moving chart 7 are provided for raising said bar 23 and permitting it to drop and strike marking elements 13. In the form shown, said means comprise a ratchet wheel 26 driven by the motor 18 through gears 27 and 28 and adapted to cooperate with a blade or finger 29 secured to an arm 30 on bar 23. The rotation of ratchet wheel 26 coacts with finger 29 to periodically raise bars 23 and permit the same to drop against one of said marking elements 13 when such element is over the chart 7 at some point between the edges thereof, at which time said element strikes ribbon 20 and presses the latter against the chart to produce the desired record.

Ribbon 20 may be shifted by the reciprocating action of bar 23, if desired, through a linkage and ratchet mechanism consisting of a link 31 engaging said bar 23, a lever 32 mounted on a fixed pivot 33, and a pawl 34 which is held in engagement with ratchet teeth on roller 22 by means of a spring 35.

In accordance with the invention, it is desirable to provide a marginal reference line adjacent one or both edges of the chart 7 for the purpose of defining the recording range and to maintain the distance representing said range constant even though the width of the chart may change due to changes in relative humidity of the surrounding atmosphere. In the illustrated embodiment a marginal reference line is produced at each of the edges of the chart 7, and for this purpose a marking element 36 is provided at each end of tapper bar 23 in a position to engage inked ribbon 20 without interfering with the operation of belt 4.

Markers 13 are spaced apart a distance equal to the distance between the marginal reference lines made by markers 36 so that when the variable quantity or function being recorded increases to a point where one curve 37 extends beyond the recording range of chart 7, the next adjacent marker 13 will start a new curve 38.

It is to be noted that the markers 13 are so spaced and arranged along the length of the endless belt 4 that when only one of them is intermediate the edges of the chart 7, and is tapped at that time, it will make a mark on the chart representing the then value of the varying quantity being recorded, and when the tapper bar 23 strikes the marking element 13, the marking elements 36 on the tapper bar 23 produce an additional mark at each edge of the chart to provide a reference margin at each of said edges, and the distance of the first mark from one of the edge marks represents the value of the quantity being recorded.

There is thus provided novel recording apparatus for recording values of a variable, which may be constructed of a small number of rugged and compactly arranged parts, and which is accurate and reliable, and whereby a more readily readable record may be produced on a comparatively narrow, linearly movable record receiving surface or chart.

Although only one embodiment of the invention has been illustrated and described, it is to be expressly understood that the invention is not limited thereto, but that changes may be made in the various mechanical details and design and in the relative arrangement of parts without departing from the spirit and scope of the invention. For a definition of the limits of the invention, reference is, therefore, to be made primarily to the appended claims.

What is claimed is:

1. A recorder for recording the value of a varying quantity upon a strip of record chart supported for longitudinal movement, comprising an endless flexible carrier arranged transversely of said chart and having a plurality of marking elements spaced along its length and so arranged that when only one of them is intermediate the edges of said chart and is tapped at that time it will make a mark on said chart representing the then value of said varying quantity, means controlled by said varying quantity for moving said carrier transversely of said chart, an elongated tapper bar of predetermined length extending transversely of said chart and along said flexible carrier for tapping one of said marking elements when it is intermediate the edges of said chart, said tapper bar also having a marking element at each end thereof for producing an additional mark at each edge of said chart to provide a reference margin at each of said edges, the distance of the first mark from one of said edge marks representing the value of the quantity being recorded, and means for actuating said tapper bar.

2. A recorder for recording the value of a varying quantity upon a strip of record chart supported for longitudinal movement, comprising an endless flexible carrier arranged transversely of said chart and having a plurality of marking elements spaced along its length and so arranged that when only one of them is intermediate the edges of said chart and is tapped at that time it will make a mark on said chart representing the then value of said varying quantity, means controlled by said varying quantity for moving said carrier transversely of said chart, an elongated tapper bar of predetermined length extending transversely of said chart and along said flexible carrier for tapping one of said marking elements when it is intermediate the edges of said chart, said tapper bar also having a marking element at each end thereof for producing an additional mark at each edge of said chart to provide a reference margin at each of said edges, the distance of the first mark from one of said edge marks representing the value of the quantity being recorded, means for actuating said tapper bar, and common means for operating said actuating means and for moving said strip of record chart longitudinally.

3. A recorder for recording the value of a varying quantity upon a strip of record chart supported for longitudinal movement, comprising a plurality of marking elements for making a mark on said chart, means controlled by said varying quantity for actuating said marking elements, an elongated tapper bar of predetermined length extending transversely of said chart for actuating said marking elements one at a time and also having a marking element at an end thereof for producing an additional mark at an edge of said chart to provide a reference margin at said edge, and means for actuating said tapper bar.

RALPH R. CHAPPELL.
RUTGER B. COLT.
ROBERT J. STREB.